T. S. Sperry -
Hoop Skirt.

2277 Reissued Jun. 5, 1866.

Witnesses

J. P. Hall

Wm. F. McNamara

Inventor.

T. S. Sperry

UNITED STATES PATENT OFFICE.

THE SILVER SKIRT AND WIRE MANUFACTURING COMPANY, OF NEW YORK, N. Y., ASSIGNEES OF T. S. SPERRY.

IMPROVEMENT IN THE MANUFACTURE OF SKIRT-WIRE.

Specification forming part of Letters Patent No. 46,718, dated March 7, 1865; Reissue No. 2,277, dated June 5, 1866.

*To all whom it may concern:*

Be it known that we, THE SILVER SKIRT AND WIRE MANUFACTURING COMPANY, of the city, county, and State of New York, are the assignees of Letters Patent of the United States granted to T. S. SPERRY for a new and useful Improvement in the Manufacture of Skirt-Wire; and we do hereby declare that the following is a full, clear, and exact description thereof, which will enable those skilled in the art to make and use the same, reference being had to the accompanying drawings, forming part of this specification, in which—

Figure 1:
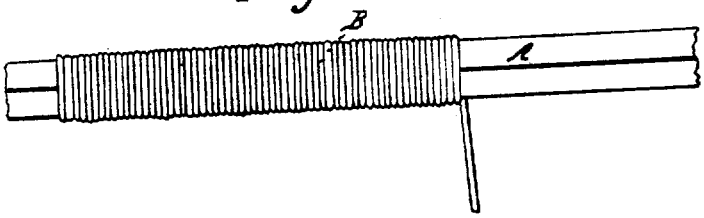
Figure 2:
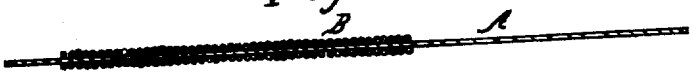

Figure 1 represents a side elevation of this invention. Fig. 2 is a longitudinal section of the same.

Similar letters of reference indicate corresponding parts.

Skirt-wire as now manufactured is covered with cotton or other fibrous material laid on by braiding or in any other suitable manner. This covering labors under the great disadvantage that it is liable to pull off after a short time, whereby the skirt becomes damaged. To avoid this disadvantage and to produce a durable covering for skirt-wire is the object of this invention, which consists in the use of thin metal wire for the purpose of covering skirt-wire, said wire to be applied by braiding or simply by winding it on in such a manner that a durable covering for skirt-wire is obtained, which will effectually protect said wire and not be liable to pull off or wear out.

A represents a piece of skirt-wire made in the usual manner, either single or double, as may be desirable. This wire is covered by metal wire B, which may be wound on, as shown in the drawings, or which may be braided on, together with cotton thread or other fibrous material, or which may be applied in any other suitable manner.

For the purpose of covering skirt-wire, iron or brass wire coated with tin, zinc, or other non-corrosive material is used by preference, and by using such wire a covering can be produced which gives to the skirt-wire a very handsome appearance, and which also will be durable and not liable to come off; but if the use of such non-corrosive wire should be too expensive ordinary plain iron or brass wire may be used, and if the same is thin enough and properly annealed it can be laid on by braiding, precisely like cotton thread or other fibrous material, and a skirt-wire can be produced which will be strong, durable, and well adapted for hoop-skirts.

We do not claim covering a central core of metal with a wrapping or coil of wire, as that has before been practiced; but

What we claim as new, and desire to secure by Letters Patent, is—

Skirt-wire protected wholly or partially by metal wire, substantially as and for the purpose described.

SILVER SKIRT & WIRE MFG. CO.
By E. D. McNICHOL, *President.*

Witnesses:
THOS. M. SOTHER,
G. B. WOOD.